United States Patent [19]

Krogh et al.

[11] Patent Number: 4,506,771
[45] Date of Patent: Mar. 26, 1985

[54] METHOD AND APPARATUS FOR OPERATING CLUTCH AND BRAKE CONTROL DEVICE OF MACHINES HAVING INTERMITTENT, UNDIRECTIONAL OPERATION

[75] Inventors: Egon Krogh, Sønderborg; Knud Blohm, Nordborg, both of Denmark

[73] Assignee: Danfoss A/S, Nordborg, Denmark

[21] Appl. No.: 402,122

[22] Filed: Jul. 26, 1982

[30] Foreign Application Priority Data

Aug. 11, 1981 [DE] Fed. Rep. of Germany ....... 3131675

[51] Int. Cl.³ .................... B60K 41/28; B60K 41/24; F16H 29/20
[52] U.S. Cl. .............................. 192/12 R; 192/0.094; 74/120; 74/125.5
[58] Field of Search ............... 192/0.03, 0.094, 0.096, 192/1, 2, 3.58, 8 R, 9, 12 R, 17 A, 17 C, 18 A; 74/120, 118, 113, 116, 130, 125.5

[56] References Cited

U.S. PATENT DOCUMENTS

| | | | |
|---|---|---|---|
| 2,970,489 | 2/1961 | Eason | 74/130 X |
| 3,022,680 | 2/1962 | Roojen | 74/130 X |
| 3,167,008 | 1/1965 | Edgeley et al. | 74/113 X |
| 3,664,471 | 5/1972 | Seidlitz | 192/9 X |
| 3,750,786 | 8/1973 | Toyohama et al. | 192/17 C |
| 3,783,795 | 1/1974 | Helmer | 192/9 X |
| 3,881,582 | 5/1976 | Conway | 192/12 C |
| 3,893,552 | 7/1975 | Dahl | 192/12 C |

Primary Examiner—George H. Krizmanich
Attorney, Agent, or Firm—Wayne B. Easton

[57] ABSTRACT

A method and apparatus for operating a switching device such as a clutch or brake for a moveable element such as a shaft which is driveable by a prime mover such as a rack and pinion device. The clutch selectively connects the shaft to the prime mover and the brake alternately and selectively connects the shaft to the housing. A motor sinusoidally reciprocates the rack by way of an eccentric drive and the rack drives a pinion on the input side of a pneumatic clutch and brake unit. The clutch is always operated in only one direction of movement and the moveable shaft can thereby be intermittently driven in one direction. A continuously rotating motor shaft carries a signal generator disc having a signal generating track in the form of recesses which are scanned photoelectrically. An operating signal which holds the clutch engaged during one half period is received by the signal generator and delivered by a control device. Switching devices such as clutches and brakes possess a certain reaction time between the occurrence of the operating signal and the instant when the clutch or brake becomes effective. The reaction time creates a problem relative to the desired requirement that the switching device become effective as close as possible to zero passage of the speed of the driving element so that the strain on the components and their wear is low. This problem is addressed by providing an actuating signal at an angular position which precedes the zero angle and initiates a delay period which does not change with a change in the rotary speed of the motor and is disposed in front of the speed zero passage by about the reaction time of the switching device.

7 Claims, 4 Drawing Figures

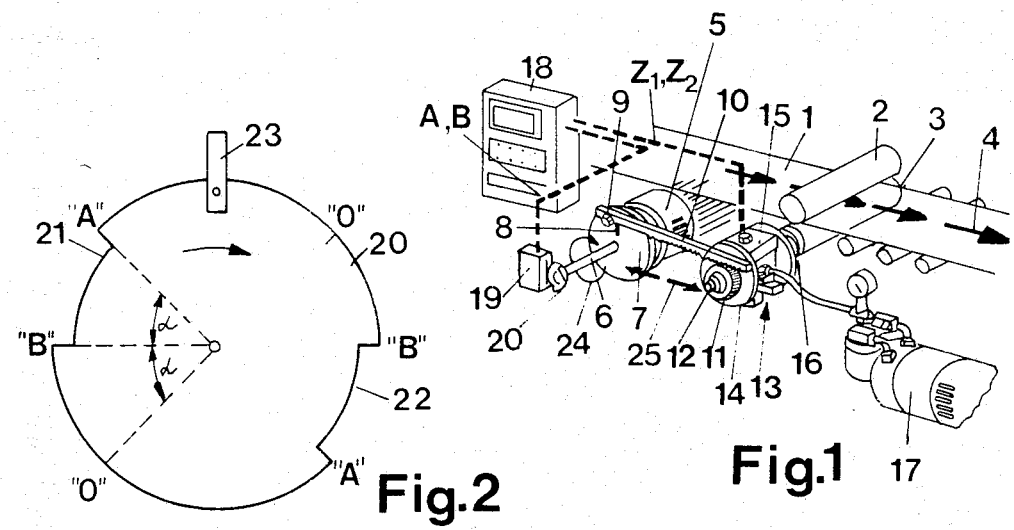
Fig.2
Fig.1
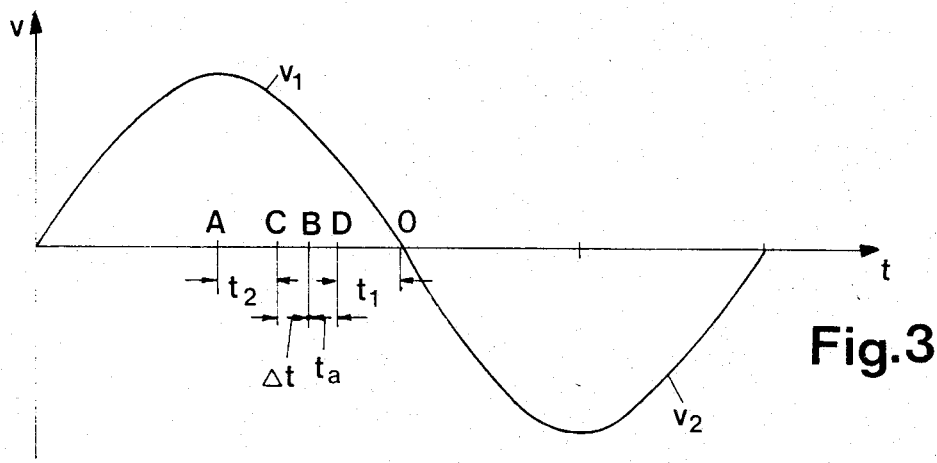
Fig.3
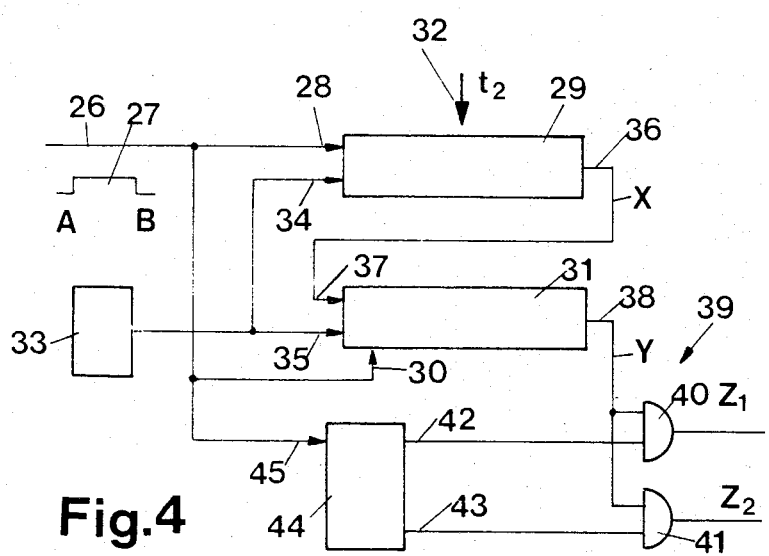
Fig.4

METHOD AND APPARATUS FOR OPERATING CLUTCH AND BRAKE CONTROL DEVICE OF MACHINES HAVING INTERMITTENT, UNDIRECTIONAL OPERATION

The invention relates to a method of operating a switching device such as a clutch or brake for a movable element drivable by a prime mover of which the speed varies periodically and passes through zero, the period being depicted by a continuously circulating signal generator in which the period frequency corresponds to the rotary speed and the speed passage through zero of the period to a zero angle and which, in a predetermined angular position, produces an actuating signal for operating the switching device, as well as to an apparatus for performing this method.

A method and apparatus of this type are known (Danfoss Prospectus T.214. 13. 1, page 13), wherein a motor sinusoidally reciprocates a prime mover in the form of a rack by way of an eccentric drive. The rack drives a pinion on the input side of a pneumatic clutch. The output element of the clutch is a transporting roller serving as the movable element. Since the clutch is always operated in only one direction of movement, the movable element can be intermittently driven in one sense. The continuously rotating motor shaft carries a signal generator disc carrying a signal generating track which is in the form of a recess, extends through 180° and is scanned photoelectrically. In this way, the operating signal which holds the clutch engaged during one half period can be received by the signal generator without substantial transformation and delivered by the control device.

Switching devices such as clutches and brakes possess a certain reaction time between the occurrence of the operating signal and the instant when the clutch or brake becomes effective. This reaction time conflicts with the desire for letting the switching device become effective as close as possible to zero passage of the speed of the driving element so that the strain on the components and their wear is low.

The invention is based on the problem of providing a method of the aforementioned kind with which the switching device can be made effective near or precisely at the speed zero passage of the prime mover independently of the rotary speed.

This problem is solved according to the invention in that the actuating signal is produced at an angular position which precedes the zero angle and initiates a delay period which decreases with an increase in rotary speed and the end of which determines an instant which, independent of the rotary speed, is disposed in front of the speed zero passage by about the reaction time of the switching device, and that an operating signal is delivered after said delay period.

In this method, the operating signal is no longer dependent on the angular position of the signal generator. Instead, by reason of the variable delay period which is initiated at a particular angular position, a preceding angle which increases with increasing rotary speed is fixed for the delivery time of the operating signal so that the switching device will indeed become effective substantially at the speed zero passage independently of the rotary speed.

A particularly accurate solution of the underlying problem is obtained in that a reference signal is produced at an angular position preceding the zero angle by twice the actuating angle and initiates a constant running time equal to the reaction time, and that the time difference is measured between the end of this running time and the occurrence of the actuating signal and is subsequently introduced as the delay period. By reason of the fact that the same time elapses between occurrence of the reference signal and occurrence of the actuating signal as between the occurrence of the actuating signal and the zero passage of the speed and the reaction time is subtracted during the first half of this time, the resulting time difference is exactly that time which can be utilized as a very accurate delay period during the second half.

An apparatus suitable for performing this method for operating a switching device such as a clutch or brake for a movable element drivable by a prime mover which is periodically moved in opposite directions by a motor by way of a crank drive or the like, wherein the motor is provided with a signal generator having a revolving disc with markings and a zero angle corresponding to the speed zero passage of the prime mover and with an associated scanning device for delivering an actuating signal, and wherein a control device delivers an operating signal in response to the actuating signal, is characterised according to the invention in that the marking of the signal generator disc is offset by an actuating angle to precede the zero angle and that the control device comprises a first time element which is to be actuated by the actuating signal, is designed for a delay period which decreases with increasing rotary speed, and delivers the operating signal at the end thereof. The signal generator disc need only be slightly modified from the prior art for this purpose. Nor is it complicated to install the time element in the control device.

In a further embodiment, it is advisable for a second marking of the signal generator disc serving to deliver a reference signal to be offset by twice the actuating angle to precede the zero angle, and for the control device to comprise a second time element which is to be actuated by the reference signal and is designed for a constant running time equal to the reaction time of the switching device, and a time difference measuring device which is actuated by the second time element and stopped by the actuating signal, and for the first time element to be so connected to the time difference measuring device that the measured time difference is usable as the delay period. This enables the time of delivery of the operating signal to be fixed extremely accurately.

Advantageously, the first time element and the time difference measuring device are formed by a forward-reverse counter fed with timing pulses. Unification of the time element and measuring device gives a very much simplified construction.

The second time element may be formed by a presettable counter fed with timing pulses. In this way one can conveniently fix the running time which is equal to the reaction time of the switching device.

It is also favourable if the signal generator disc comprises a circumferential signal generating track extending from the second to the first marking and the signal generator therefore delivers at the output a pulse of which the front flank forms the reference signal and the rear flank forms the actuating signal. The ends of the signal generating track, for example a recess, give accurately defined switching points and therefore permit more efficient operation than when using individual pulses for characterising the reference signal or actuating signal.

In particular, it is possible for the output of the signal generator to be connected to the start input of the presettable counter and the switchover input of the forward-reverse counter, for the output of the presettable counter to be connected to the start input of the forward-reverse counter and for the output thereof to be connected to a logic circuit for delivering the operating signal. In this case, no transformer stages are required for converting the front flank or rear flank to special signals. Instead, starting the presettable counter, starting of the forward-reverse counter, its switching over and delivery of the operating signal take place automatically and in the correct sequence.

The invention will now be described in more detail with reference to a preferred example illustrated in the drawing, wherein:

FIG. 1 is a diagrammatic representation of a switching device operated in accordance with the invention;

FIG. 2 shows one embodiment of a signal generator disc;

FIG. 3 is a time graph of the speed of the prime mover, and

FIG. 4 is a block diagram of one embodiment of a control device.

FIG. 1 shows a web 1 of material transported in the direction of the arrows 4 with the aid of two transporting rollers 2 and 3. The lower transporting roller is driven by an electric motor 5 carrying a drive disc 7 on its shaft 6. A hinge 9 is adjustably arranged in a slot 8 of this disc. A rack 10 pivoted to it acts on a pinion 11 at the input shaft 12 of a switching device 13. Between the latter and the transporting roller 3 there is a clutch 14 and between the transporting roller 3 and the housing 15 of the switching device there is a brake 16.

Compressed air from a vessel 17 serves to operate the clutch 14 or brake 16. The compressed air is supplied by means of valves in the housing 15 when the valves receives from a control device 18 actuating signals $Z_1$ for the clutch or $Z_2$ for the brake. The control device 18 receives reference signals A and actuating signals B from a signal generator 19. The signal generator contains a disc 20 having signal tracks 21, 22 in the form of recesses, and a scanning device 23 which photoelectrically scans same (see FIG. 2). One end of the track forms a respective marking "A" for delivery of the reference signal A and the other end forms a marking "B" for delivery of the actuating signal B. Their angular difference $\alpha$ is equal to the angle between the zero angle "0" and the marking "B".

The rack 10 is prime mover having the speed v per unit time t as shown in FIG. 3. With continuous rotary motion of the motor 5 in accordance with the arrow 24, it therefore reciprocates as shown by the arrows 25. The clutch 14 is always switched on during forward motion (section $v_1$ of the curve in FIG. 3) and the brake 16 is always switched on during return motion (section $v_2$). This results in intermittent advance in accordance with the arrows 4 during the section $v_1$ and standstill during the section $v_2$.

Between the occurrence of the switching signal $Z_1$ or $Z_2$ and when the clutch 14 or brake 16 becomes effective, a certain reaction time $t_1$ elapses. For this reason, the switching signal is not to be delivered as late as the speed zero passage 0 but already at the instant D prior to zero passage. To make this possible independently of the rotary speed of the motor 5, an actuating signal B is delivered at a fixed actuating angle $\alpha$ in front of the speed zero passage 0, whereafter a delay time $t_a$ is initiated which decreases with an increase in rotary speed. This gives an instant D independently of the rotary speed of the motor 5 disposed in front of zero passage substantially by the reaction time.

To enable the delay period $t_a$ to be fixed as accurately as possible, a reference signal A is produced to precede by twice the actuating angle $\alpha$, the reference signal initiating a running time $t_2$ which is equal to the reaction time $t_1$. The time difference $\Delta_t$ between the instants C and B decreases with increasing rotary speed. If one selects this time difference as the delay period $t_a$, the reaction time $t_1$ will terminate precisely at zero passage 0 because the sections A-B and B-0 are equal.

To embody this manner of operation, one example is shown in FIG. 4. Pulses 27 of which the front flanks represent the reference signal A and the rear flanks the actuating signal B are supplied by way of an input 26. The pulses 27 are fed to the start input 28 of a presettable counter 29 and the switching over input 30 of a forward-reverse counter 31. At the presetting input 32 of the counter 29, the running time $t_2$ is set to the value of the reaction time $t_1$. A timing pulse generator 33 feeds the timing input 34 of the counter 29 and the timing input 35 of the counter 31 with timing pulses. The output 36 of the counter 29 is connected to the start input 37 of the forward-reverse counter 31. The output 38 thereof leads to a logic circuit 39 with two AND elements 40 and 41. The other inputs are fed by the outputs 42 and 43 of a flip-flop 44 which switches over whenever the pulse 27 occurs at its input 45. Consequently, the operating signal $Z_1$ for the clutch can be derived at the output of the AND element 40 and the operating signal $Z_2$ for the brake can be derived at the output of the AND element 41.

On the occurrence of the pulse 27, the counter 29 starts to count until the preset value has been counted at the end of the running time $t_2$, whether this be backwards from the set value up to zero or from zero to the set value. As soon as counting has finished, a transmission signal X is delivered which starts the counter 31 in forward operation. As soon as the actuating signal B has occurred, i.e. when the pulse 27 has terminated, the counter 31 switches over to reverse operation and counts backwards to zero from the number achieved at this instant. This accurately determines the instant D. A releasing signal Y is now supplied to the logic circuit 39. Prior to this, the flip-flop was preset with the aid of the pulse 27, so that the correct switching device is always operated even though the two signal tracks 21 and 22 are identical.

In one example, a disc 20 of black anodised aluminium was employed. The angle $\alpha$ was 45°. With a reaction time $t_1 = 19$ ms and a rotary speed of 300 revolutions per minute, the actuating time $t_a$ was 6 ms. With a rotary speed of 25 revolutions per minute, an actuating time of $t_1 = 280$ ms resulted. The timing pulse frequency amounted to 10 kHz. The counter 29 was a three-decade-decimal counter and the counter 31 a three-decade-binary counter. The resolution with respect to time amounted to 0.1 ms.

We claim:

1. A method for periodically operating a switching device of a clutch having an inherent fixed reaction time (t1) so as to be effective at a predetermined point (x) in periods of varying time, comprising the steps, providing variable speed rotating means operable with periods of varying time, generating from said rotating means a reference signal (A) and an actuating signal (B) during each of said periods wherein said actuating signal (B) has an arbitrary fixed angular displacement ($\alpha$) leading said predetermined point (x) and a fixed angular displacement ($\alpha$) of the same magnitude trailing said reference signal (A), providing a reference time increment (t2) equal to said reaction time (t1), utilizing said reference signal (A) in conjunction with said reference time increment (t2) to generate a first signal time (C) which trails said reference signal (A) by said time increment (t2), utilizing said first signal time (C) to initiate a first counting interval ($\Delta t$), utilizing said actuating signal (B) to stop said first counting interval ($\Delta t$) and initiate a second counting interval (ta), utilizing the end of said first counting interval ($\Delta t$) to make the length of said second counting interval (ta) equal thereto, utilizing the end of said second counting interval (ta) to generate an actuation time (D), and utilizing said actuation time (D) to generate a signal for operating said switching device.

2. A method according to claim 1 including the step of utilizing said rotating means to operate reciprocating means having opposite dead center positions, said predetermined point (x) corresponding to one of said dead center positions.

3. A system for periodically operating a switching device of a clutch or the like having an inherent fixed reaction time (t1) so as to be effective at a predetermined point (x) in periods of varying time, comprising, variable speed rotating means operable with periods of varying time, first signal generating means for generating from said rotating means a reference signal (A) and an actuating signal (B) during each of said periods wherein said actuating signal (B) has an arbitrary fixed angular displacement ($\alpha$) leading said predetermined point (x) and a fixed angular displacement ($\alpha$) of the same magnitude trailing said reference signal (A), reference time means for providing a reference time increment (t2) equal to said reaction time (t1), second signal generating means for utilizing said reference signal (A) in conjunction with said reference time increment (t2) to generate a first signal time (C) which trails said reference signal (A) by said time increment (t2), timing means for utilizing said first signal time (C) to initiate a first counting interval (t), and utilizing said actuating signal (B) to stop said first counting interval ($\Delta t$), said timing means initiating a second counting interval (ta) at the end of said first counting interval ($\Delta t$) and utilizing the length thereof to make the length of said second counting interval (ta) equal thereto, third signal generating means for utilizing the end of said second counting interval (ta) to generate an actuation time (D), and actuation means for utilizing said actuation time (D) to generate a signal for operating said switching device.

4. A system according to claim 3 including reciprocating means operated by said rotating means having opposite dead center positions, said predetermined point (x) corresponding to one of said dead center positions.

5. A system according to claim 3 wherein said first signal generating means include a rotatable disk having markings for initiating said reference and actuating signals and relatively stationary means for sensing said markings and generating corresponding signals for operating said second signal generating means and said second timing means.

6. A system according to claim 5 wherein said second signal generating means is a clocked presettable counter which is set by said reference signal (A) and stopped at the termination of said reference time increment (t2).

7. A system according to claim 6 wherein said timing means is a clocked reversible counter wherein said first counting interval ($\Delta t$) is in one direction thereof and said second counting interval is in the opposite direction thereof.

* * * * *